United States Patent
Horita et al.

[11] Patent Number: 5,859,941
[45] Date of Patent: Jan. 12, 1999

[54] OPTICAL ADD/DROP MULTIPLEXER DEVICE

[75] Inventors: Masayoshi Horita; Shinsuke Tanaka; Yuichi Matsushima, all of Saitamaken, Japan

[73] Assignee: Kokusai Denshin Denwa Kabushiki Kaisha, Tokyo, Japan

[21] Appl. No.: 760,491

[22] Filed: Dec. 5, 1996

[30] Foreign Application Priority Data

Dec. 7, 1995 [JP] Japan .................................. 7-319327
May 28, 1996 [JP] Japan .................................. 8-133813

[51] Int. Cl.$^6$ ....................................................... G02B 6/34
[52] U.S. Cl. .......................... 385/37; 359/127; 359/130; 385/9; 385/24; 385/40; 385/50; 385/10
[58] Field of Search .................................... 385/9, 10, 14, 385/15, 24, 27, 28, 30, 37, 40, 41, 50, 129–132; 359/127, 130, 132

[56] References Cited

U.S. PATENT DOCUMENTS

| | | | |
|---|---|---|---|
| 4,673,270 | 6/1987 | Gordon | 385/30 X |
| 4,737,007 | 4/1988 | Akferness et al. | 385/30 |
| 5,253,314 | 10/1993 | Alferness et al. | 385/40 |
| 5,333,216 | 7/1994 | Sakata et al. | 385/28 |
| 5,457,758 | 10/1995 | Snitzer | 385/30 |
| 5,459,801 | 10/1995 | Snitzer | 385/30 |
| 5,495,543 | 2/1996 | Alferness et al. | 385/37 |
| 5,600,473 | 2/1997 | Huber | 385/10 X |
| 5,636,309 | 6/1997 | Henry et al. | 385/129 |

FOREIGN PATENT DOCUMENTS

| | | |
|---|---|---|
| 0306956 | 9/1988 | European Pat. Off. . |
| 2270174 | 3/1994 | United Kingdom . |

OTHER PUBLICATIONS

Article from *IEEE Photonics Technology Letters*, vol. 6, No. 1, Jan. 1994, entitled Four–Channel Tunable Optical Notch Filter Using InGaAsP/InP Reflection Gratings, by Jean–Pierre Weber, Member, IEEE, Björn Stoltz, Marie Dasler and Bert Koek, pp. 77–79.

Article entitled, Low–Loss ADD/DROP Multiplexers for WDM Lightwave Networks, by C.R. Giles and V. Mizrahi, AT&T Bell Laboratories, pp. 66 and 67; IOOC95, paper Thc2–1 (1995). [No Month].

Article from *Appl. Phys. Lett.* 55(19), dated Nov. 6, 1989, entitled Grating–assisted InGaAsP/InP Vertical Codirectional Coupler Filter, by R. C. Alferness, T.L. Koch, L. L. Buhl, F. Storz, F. Heismann and M.J.R. Martyak AT&T Bell Laboratories, pp. 2011–2013.

Article from *EEE Phonics Technology Letters*, vol. 3 No. 10, dated Oct. 1991, entitled "Grating–Assisted Directional Coupler Filters Using ALGaAs/GaAs MQW Waveguides", Hajime Sakata and Shinsuke Takeuchi, pp. 899–901.

"Enhanced Wavelength Tuning in Grating–Assisted Codirectional Coupler Filter" Chuang and Coldren, *Photonics Technology Letters*, No. 10, Oct. 1993, vol. 5, pp. 1219–1221.

(List continued on next page.)

*Primary Examiner*—John D. Lee
*Attorney, Agent, or Firm*—Banner & Witcoff Ltd.

[57] ABSTRACT

An optical add/drop multiplexer device which is capable of extracting or inserting optical signals of arbitrary wavelength and having a wavelength selection characteristic with a narrow bandwidth, and which is compact in size and highly reliable. The device is formed by a substrate member; a plurality of optical waveguides, formed over the substrate member in layers with a prescribed interval along a direction perpendicular to a plane of the substrate member, each optical waveguide having a portion arranged in parallel and in proximity to an adjacent optical waveguide to form a coupling section; and a diffraction grating member, provided at the coupling section and having a prescribed period along a light propagation direction, for reflecting light signals with a specific wavelength among light signals entered from one of adjacent optical waveguides to another one of the adjacent optical waveguides.

27 Claims, 11 Drawing Sheets

OTHER PUBLICATIONS

"Vertically coupled InGaAsP/InP buried rib waveguide filter" Alferness, et al., *Applied Physics Letters*, No. 20, Nov. 11, 1991, vol. 59, pp. 2573–2575.

"Wavelength tuning in a grating–assisted vertical coupler filter using quantum well electrorefraction" Sakata and Takeuchi, *Applied Physics Letters*, No. 24, Dec. 9, 1991, vol. 59, pp. 3081–3083.

"Proposal of New Narrow–band Wavelength Filter using Grating–assisted Vertical Contra–directional Coupler" Tanaka, et al., Apr. 21, 1996, pp. 234–237. [No Journal Name Given].

"Four–Channel Tunable Optical Notch Filter Using InGaAsP/InP Reflection Gratings" Weber, et al., *Photonics Technology Letters*, vol. 6, No. 1, Jan. 1994, pp. 77–79.

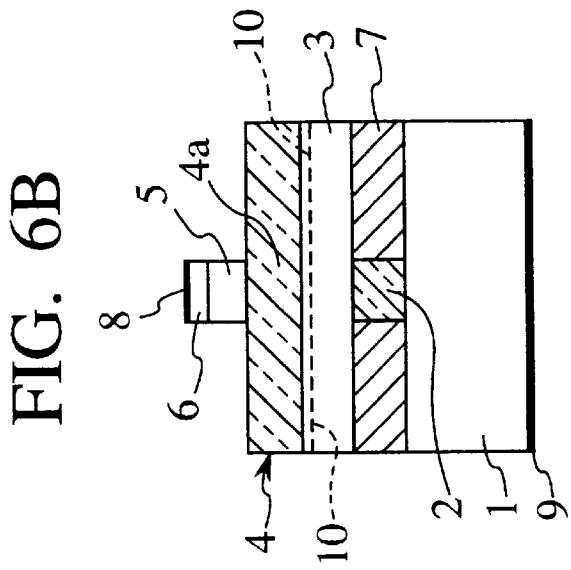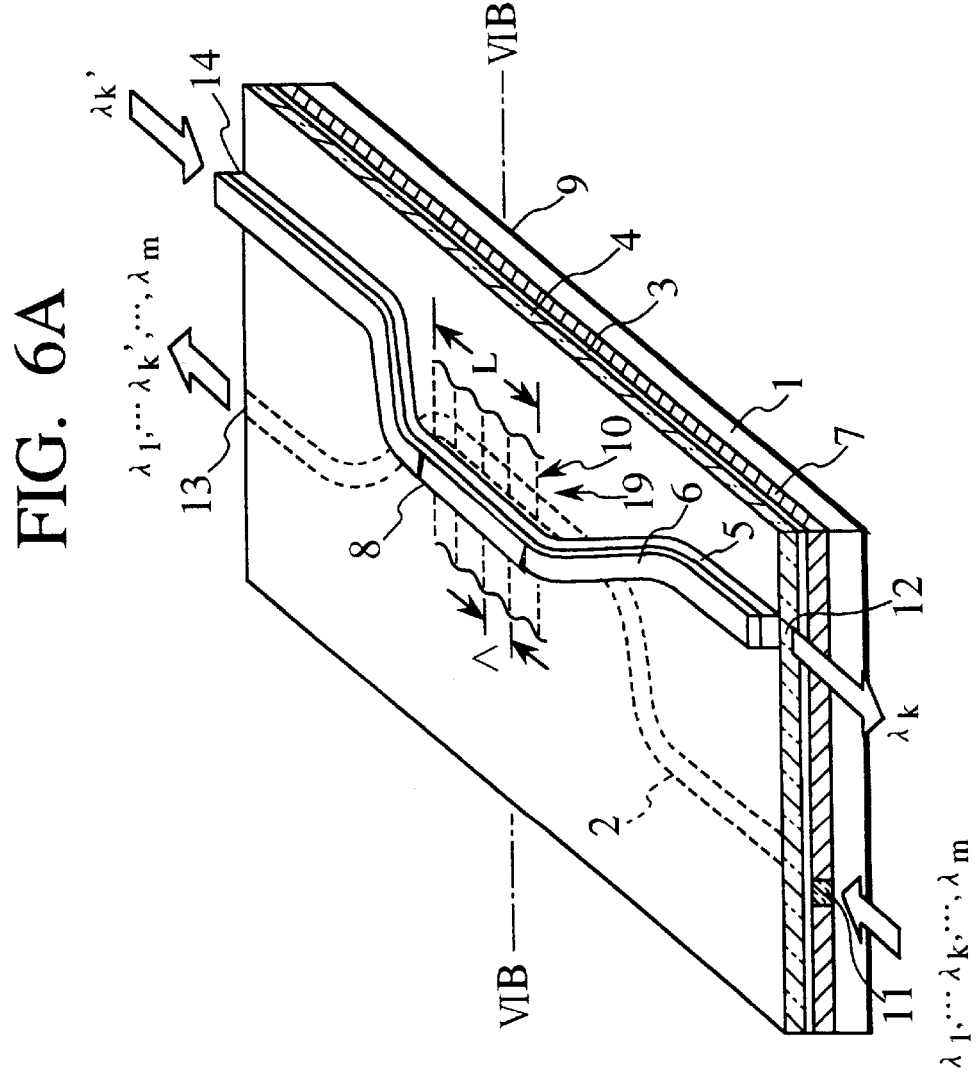

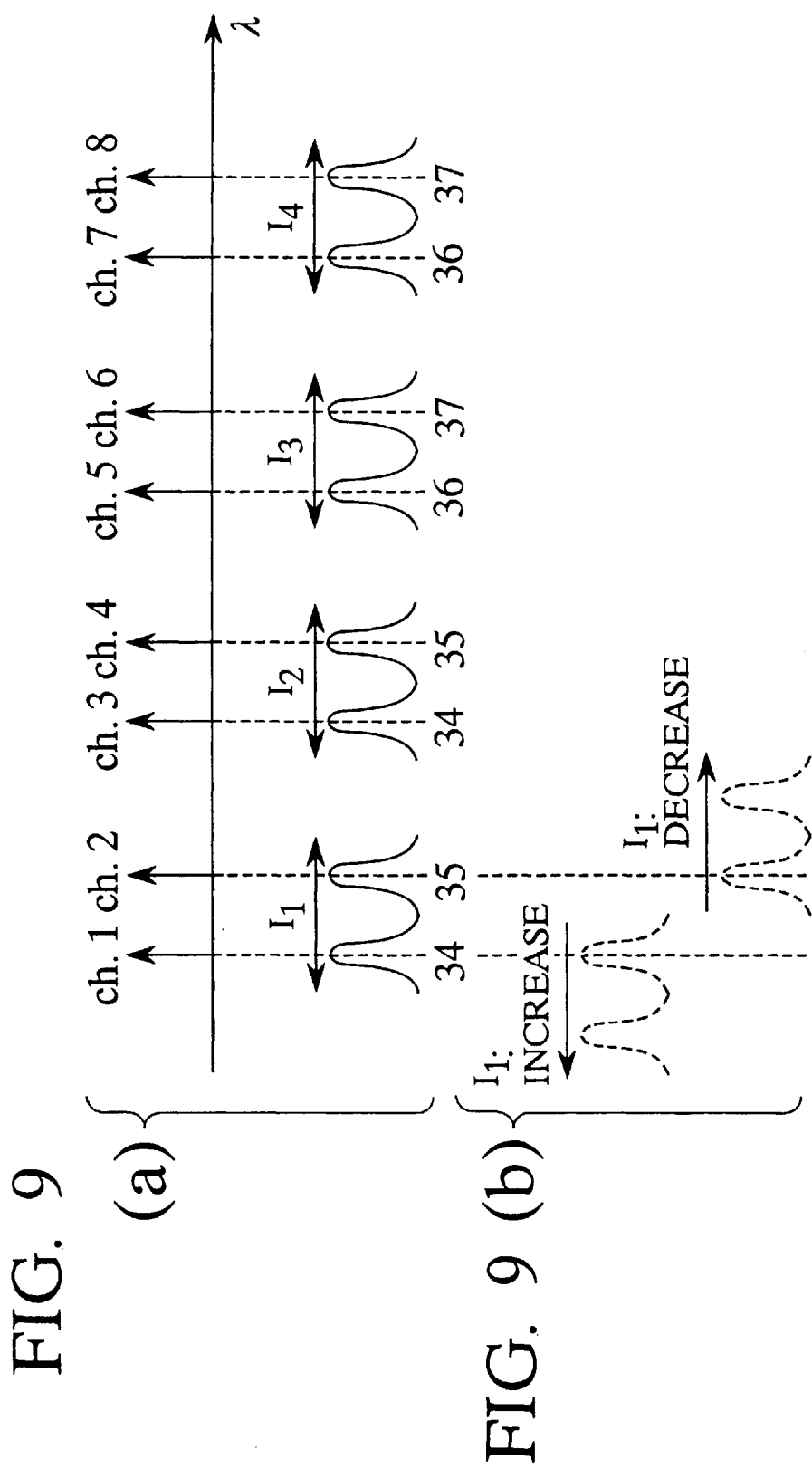

OPTICAL ADD/DROP MULTIPLEXER DEVICE

BACKGROUND OF THE INVENTION

1. Field of the Invention

The present invention relates to an optical add/drop multiplexer device for extracting or inserting optical signals of a specific wavelength at a specific node in constructing a wavelength division multiplexing network in a transmission system for long distance optical fiber communication, optical subscriber system communication, optical LAN, optical CATV, etc.

2. Description of the Background Art

In a recent trend for broadband multimedia communication, in addition to a demand for drastic increase of a transmission capacity of the optical communication system, there is also a demand for improvement in a flexibility of the optical communication system by way of parallel implementation or network implementation, for example. The wavelength division multiplexing (WDM) scheme is a transmission scheme that can satisfy the above condition, so that it is an important technology which is applicable to a wide range of transmission systems ranging from a long distance transmission system to a subscriber access system. For instance, in the WDM scheme, it is possible to extract or insert only a part of optical signals at a specific node so as to realize an effective utilization of a transmission path, unlike a conventional single wavelength communication.

In the WDM scheme, in practice, there is a need to provide an optical add/drop multiplexer (ADM) device having a function for extracting only those optical signals which have a specific wavelength by using a wavelength selection filter, or a function for inserting only those optical signals which have a specific wavelength, at a point where transmission paths intersect.

An operation of such a conventional optical ADM device will now be described with reference to FIG. 1. In a state where optical signals in four channels having different wavelengths $\lambda_1$ to $\lambda_4$ are transmitted from a ground 91, when an optical ADM device 90 is provided between the ground 91 and another ground 93 as shown in FIG. 1, it becomes possible to extract or insert only those optical signals which have a specific wavelength $\lambda_2$ at an intermediate ground 92, without terminating a cable.

For this type of optical ADM device, it is possible to use a configuration as shown in FIG. 2 in which a fiber grating filter 94 is used in combination with optical circulators 95 and 96 (see C. R. Giles and V. Mizrahi, "Low-Loss ADD/DROP Multiplexers for WDM Lightwave Networks", paper ThC201, in Technical Digest of IOOC '95), or a configuration in which a plurality of dielectric multilayer filters are combined.

In addition, there are also reports of waveguide type wavelength selection filters using semiconductors or dielectrics. The wavelength selection filters using semiconductors include a directional coupler filter using a grating (see R. C. Alferness, T. L. Koch, L. L. Buhl, F. Storz, F. Heismann, and M. J. R. Martyak, "Grating-Assisted InGaAsP/InP vertical codirectional coupler filter", Applied Physics Letter, Vol. 55, pp. 2011–2013 (1989), or H. Sakata and S. Takeuchi, "Grating-Assisted Directional Coupler Filters Using AlGaAs/GaAs MWQ Waveguides", IEEE Photonics Technology Letters, Vol. 3, pp. 899–901 (1991)), and a notch filter using a grating (see J.-P. Weber, B. Stoltz, M. Dasler, and B. Koek, "Four-channel Tunable Optical Notch Filter Using InGaAsP/InP Reflection Gratings", IEEE Photonics Technology Letters, Vol. 6, No. 1, pp. 77–79 (1994)).

FIG. 3 shows the directional coupler filter as disclosed by Alferness et al., while FIGS. 4A ad 4B show the notch filter as disclosed by Weber et al.

Now, in the WDM scheme, there is a need to increase a number of transmission wavelengths in order to increase a transmission capacity, and as a wavelength interval becomes narrower, a filter characteristic of an optical ADM device is also required to have a narrower bandwidth. In addition, from a point of view of improving the flexibility of the network, it is desirable to be able to freely select a channel (wavelength) to be added/dropped at a specific node or to change a number of channels to be added/dropped at a specific node. For example, in the WDM scheme using four channels with wavelengths $\lambda_1$ to $\lambda_4$ as shown in FIG. 1 in which the optical signals with the wavelength $\lambda_2$ can be added/dropped at the ground 92, it would be desirable if it is also possible to add/drop the wavelength $\lambda_3$ instead of the wavelength $\lambda_2$, or to add/drop two channels of $\lambda_2$ and $\lambda_3$ instead of just one channel. When the optical ADM device having such a function is available, it will be possible to flexibly deal with a change of channel demand so that it will be useful for the restoration in a case of emergency as well, and it will be possible to construct a dynamic WDM network.

In the conventional optical ADM device using a fiber grating or a dielectric multilayer filter, it is possible to obtain the filter characteristic with a narrow bandwidth, but this in turn requires optical components such as optical circulators and 3dB couplers so that the device itself becomes quite large in size, which is both ineconomical as well as problematic from a point of view of reliability.

In addition, it is difficult to change the wavelength to be selected by the filter in the conventional optical ADM device. Consequently, in order to realize selections of a plurality of channels, it is necessary to arrange a plurality of optical ADM devices in parallel or in series, but this in turn requires a complicated configuration.

On the other hand, in the waveguide type wavelength filter using semiconductors, it is possible to realize a configuration in which currents can be injected into a filter region so that the reflectivity of the filter region can be controlled by a change of the injected currents, and by means of this configuration it is possible to change the wavelength to be selected by the filter.

However, in the directional coupler type wavelength filter mentioned above, it is necessary to elongate the coupling length in order to obtain the filter characteristic with a narrow bandwidth, and this in turn gives rise to a problem of a large size of the device. For instance, in the exemplary configuration disclosed by Alferness et al., the 3dB width of the filter characteristic becomes 6.5 nm for the coupling length of 1 mm. In addition, in order to control the filter characteristic such as the half width, an interval between two optical waveguides or a grating shape must be controlled rigorously so that there is a problem in that it becomes increasingly difficult to manufacture the device when the coupling is made stronger.

SUMMARY OF THE INVENTION

It is therefore an object of the present invention to provide an optical add/drop multiplexer device which is capable of extracting or inserting optical signals of arbitrary wavelength and having a wavelength selection characteristic with a narrow bandwidth, and which is compact in size and highly reliable.

According to one aspect of the present invention there is provided an optical add/drop multiplexer device, comprising: a substrate member; a plurality of optical waveguides, formed over the substrate member in layers with a prescribed interval along a direction perpendicular to a plane of the substrate member, each optical waveguide having a portion arranged in parallel and in proximity to an adjacent optical waveguide to form a coupling section; and a diffraction grating member, provided at the coupling section and having a prescribed period along a light propagation direction, for reflecting light signals with a specific wavelength among light signals entered from one of adjacent optical waveguides to another one of the adjacent optical waveguides.

Other features and advantages of the present invention will become apparent from the following description taken in conjunction with the accompanying drawings.

BRIEF DESCRIPTION OF THE DRAWINGS

FIG. 6A is a perspective view of an optical add/drop multiplexer device according to the second embodiment of the present invention.

FIG. 6B is a cross sectional view of the optical add/drop multiplexer device of FIG. 6A along VIB—VIB line indicated in FIG. 6A.

FIGS. 9(a) and 9(b) are diagrams for explaining an exemplary operation of the optical add/drop multiplexer device of FIGS. 8A and 8B.

DETAILED DESCRIPTION OF THE PREFERRED EMBODIMENTS

Now, the preferred embodiments of the optical add/drop multiplexer device according to the present invention will be described in detail with references to the drawings.

Figure 1:
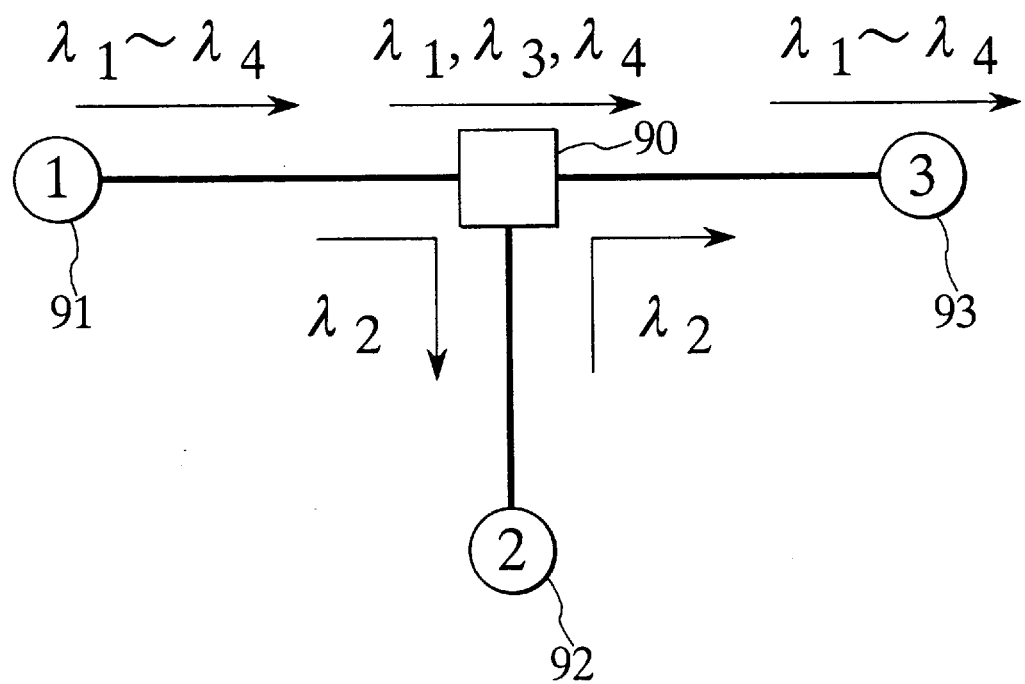
FIG. 1 is a diagram for explaining a general concept of an optical add/drop multiplexer device.
Figure 2:
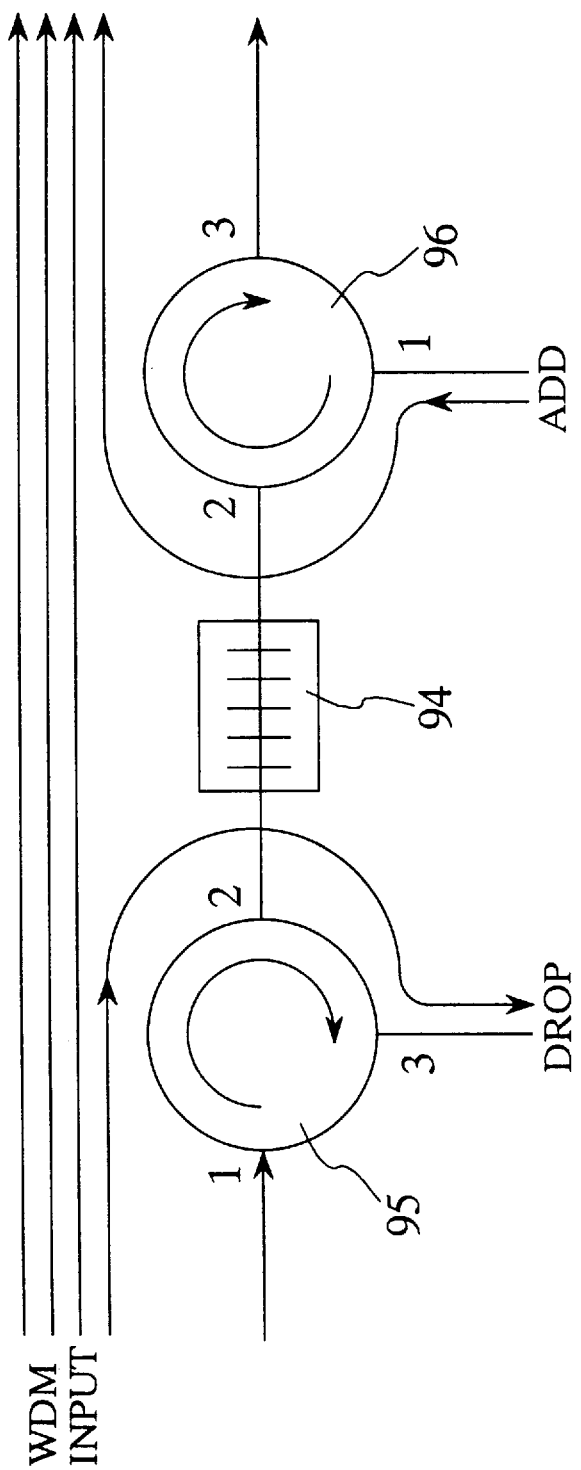
FIG. 2 is a diagram showing a configuration of a conventional optical add/drop multiplexer device using a combination of a fiber grating and optical circulators.
Figure 3:
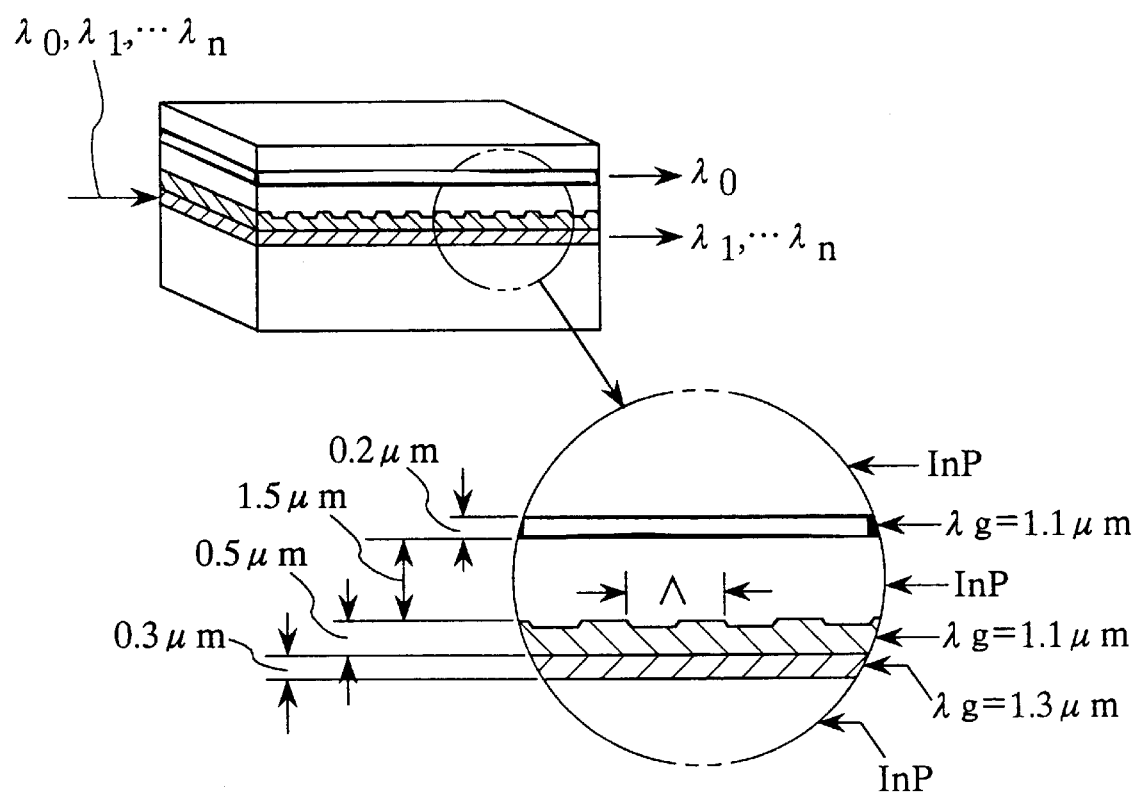
FIG. 3 is a perspective view with an enlarged detail of a conventional directional coupler filter as disclosed in Alferness et al.
Figure 4A:
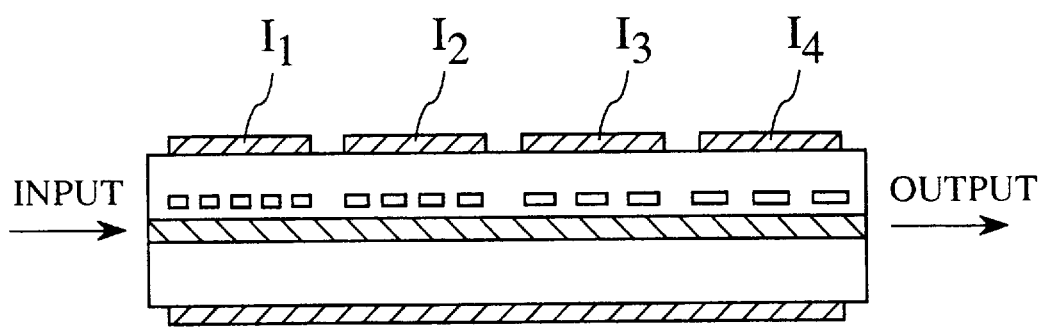
FIGS. 4A and 4B are longitudinal and transverse cross sectional views of a conventional notch filter as disclosed in Weber et al.
Figure 4B:
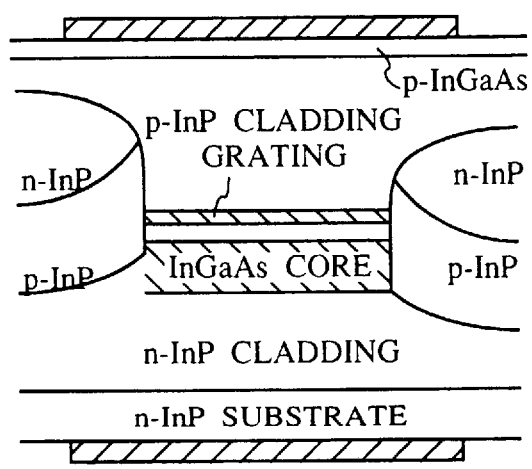
Figure 5B:
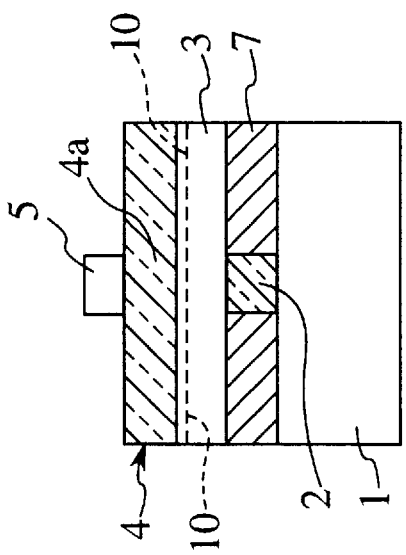
FIG. 5B is a cross sectional view of the optical add/drop multiplexer device of FIG. 5A along VB—VB line indicated in FIG. 5A.
Figure 5A:
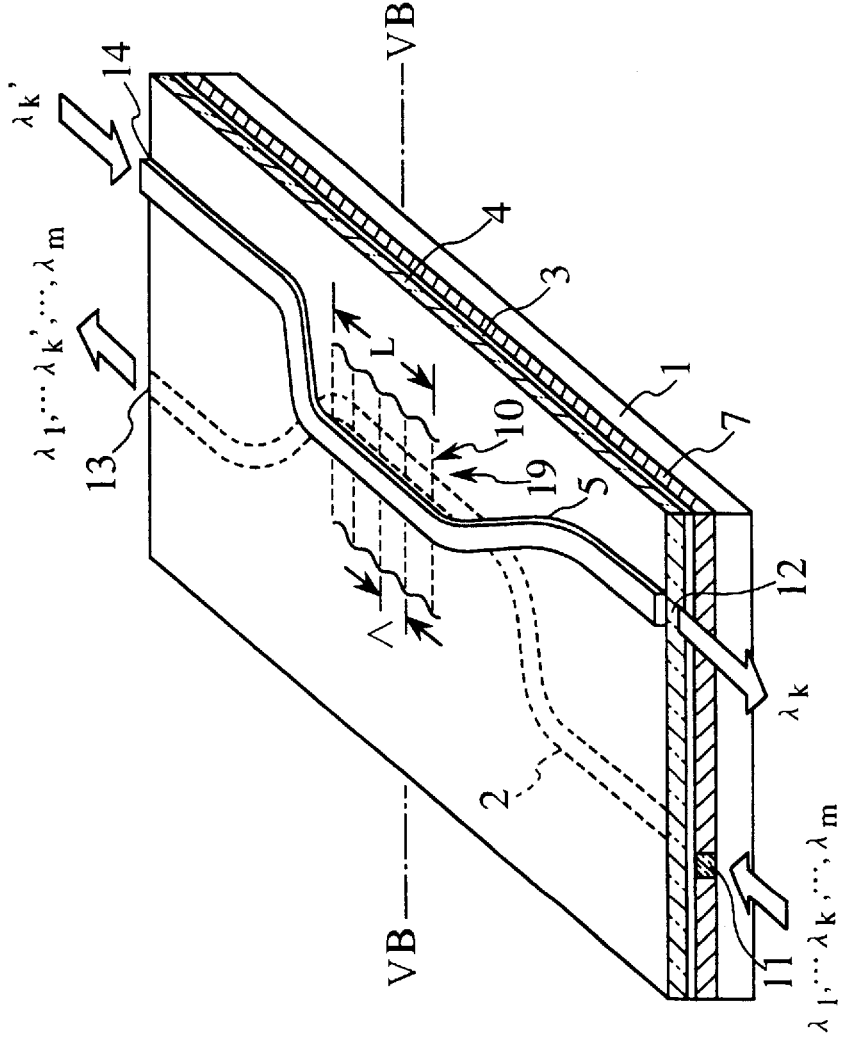
FIG. 5A is a perspective view of an optical add/drop multiplexer device according to the first embodiment of the present invention.

FIGS. 5A and 5B show a configuration of the optical add/drop multiplexer device (abbreviated hereafter as optical ADM device) according to the first embodiment of the present invention.

In this optical ADM device of FIGS. 5A and 5B, a semi-insulating layer 7 made of InP is formed on an n-type semiconductor substrate 1 made of InP, and a lower optical waveguide 2 made of InGaAsP is buried in the semi-insulating layer 7. As indicated by dashed lines in FIG. 5A, this lower optical waveguide 2 is formed in a shape which is extended straight from an input port 11, curved to one side (right side in FIG. 5A), extended straight again, curved to the other side (left side in FIG. 5A), and extended straight to reach to a through port 13.

In addition, a waveguide separation layer 3 made of InP is formed on the lower optical waveguide 2 and the semi-insulating layer 7, and an upper optical waveguide layer 4 made of InGaAsP is formed on the waveguide separation layer 3. Then, a cladding layer 5 made of InP is formed on a part of the upper optical waveguide layer 4 so as to form an upper optical waveguide 4a at a portion of the upper optical waveguide layer 4 which is located directly below the cladding layer 5. As shown in FIG. 5A, the cladding layer 5 and the upper optical waveguide 4a are formed in a shape which is extended straight from a drop port 12, curved toward the lower optical waveguide 2, extended straight in parallel to the lower optical waveguide 2 for a prescribed distance L so as to form a coupling section 19 between the lower optical waveguide 2 and the upper optical waveguide layer 4, curved away from the lower optical waveguide 2, and extended straight to reach to an add port 14.

At the coupling section 19 at which the lower optical waveguide 2 and the upper optical waveguide 4a are running in parallel at proximity, a diffraction grating 10 with a prescribed period Λ is provided over the prescribed distance L, so that the coupling section 19 constitutes a filter region for passing or dropping light signals of a plurality of wavelengths entered from the input port 11 as will be described below. In the following, the prescribed distance L will be referred to as a coupling length. Note here that, as indicated in FIG. 5B, the diffraction grating 10 can be formed by embedding a plurality of rod shaped elements made of InGaAsP, for example, at the prescribed period Λ, in the waveguide separation layer 3 between the lower optical waveguide 2 and the upper optical waveguide layer 4. Alternatively, the diffraction grating 10 can be formed by shaping a lower face of the upper optical waveguide layer 4 contacting the waveguide separation layer 3 or an upper face of the waveguide separation layer 3 contacting the upper optical waveguide layer 4 into a corrugated shape or a rugged shape with the prescribed period Λ.

The input port 11 is coupled with the filter region at the coupling section 19 via a curved waveguide of the lower optical waveguide 2, and connected to the through port 13 via a curved waveguide from the lower optical waveguide 2 in the filter region. Also, the add port 14 is coupled with the filter region via a curved waveguide of the upper optical waveguide 4a, and connected to the drop port 12 via a curved waveguide of the upper optical waveguide layer 4 from the filter region. In this first embodiment, curved waveguides are used in order to realize an easy coupling with external fibers, etc., but it is also possible to replace a part of a whole of the curved waveguides by straight waveguides, and in essence, the required function of the optical ADM device can be realized by the central filter region alone.

In the optical ADM device in such a configuration, the light signals of m wavelengths $\lambda_1$ to $\lambda_m$ inserted from the input port 11 are lead to the filter region at the coupling section 19 by the lower optical waveguide 2. Among the light signals lead to the filter region, only those light signals with a prescribed wavelength $\lambda_k$ are reflected by the diffraction grating 10 constituting the filter region and dropped from the drop port 12, while the light signals of the other wavelengths are passed through the filter region and outputted from the through port 13.

In further detail, the period Λ of the diffraction grating 10 is set up according to the following equation (1):

$$\Lambda = \lambda_k / (n_1 + n_2) \quad (1)$$

where $n_1$ is an effective refractive index of the lower optical waveguide 2, $n_2$ is an effective refractive index of the upper optical waveguide 4a, and $1 \leq k \leq m$ so that $\lambda_k$ is one specific wavelength among $\lambda_1$ to $\lambda_m$.

Then, by setting up an interval between the lower optical waveguide 2 and the upper optical waveguide 4a appropriately, only the light signals in a channel of the wavelength $\lambda_k$ are reflected by the diffraction grating 10 and outputted from the drop port 12, while the light signals of the other wavelengths are passed through the filter region and outputted from the through port 13.

Here, a wavelength filter formed by the diffraction grating 10 is of a reflection type, so that it can be realized with a shorter coupling length than a conventionally used transmission type element with a narrow half width. For example, the wavelength interval required in the actual WDM system is 1 nm or less, and according to the numerical calculation, this wavelength interval can be realized by using the coupling length L of 1 mm or less in the optical ADM device of the present invention. The detailed calculation result will be described below.

On the other hand, in the optical ADM device shown in FIGS. 5A and 5B, when the light signals of a wavelength $\lambda_k$ (denoted as $\lambda_k'$ in FIG. 5A) are entered from the add port 14 in a state where the light signals of m wavelengths $\lambda_1$ to $\lambda_m$ are inserted from the input port 11, the entered light signals are reflected by the diffraction grating 10 of the filter region similarly, and outputted from the through port 13 together with the transmitted light signals of the other channels. Consequently, the optical ADM device of FIGS. 5A and 5B can drop/add the light signals of the wavelength $\lambda_k$.

In addition, by setting up the period Λ and a depth d of the diffraction grating 10 and the coupling length L appropriately, it is possible to adjust the half width for the reflection characteristic of the diffraction grating 10, so that it is also possible to drop/add a plurality of channels centered around the wavelength $\lambda_k$.

Next, FIGS. 6A and 6B show a configuration of the optical ADM device according to the second embodiment of the present invention. This optical ADM device of FIGS. 6A and 6B differs from that of FIGS. 5A and 5B in that electrodes for carrying out the current injection or the electric field application are provided in order to make the effective refractive indexes of the optical waveguides variable so that the channels selected by the diffraction grating 10 can be changed easily. The rest of the configuration and the operation of this optical ADM device of FIGS. 6A and 6B are identical to those of FIGS. 5A and 5B so that the corresponding structural elements are given the same reference numerals in the figures and their description will be omitted.

In the optical ADM device of FIGS. 6A and 6B, a p-type capping layer 6 made of InGaAsP is formed on the cladding layer 5, and a p-side (positive) electrode 8 is formed on this capping layer 6, while an n-side (negative) electrode 9 is formed on a lower side of the semiconductor substrate 1. Note that the n-side electrode 1 is formed over an entire lower side of the semiconductor substrate 1, whereas the p-side electrode 8 is formed only for a length of the coupling length L at the coupling section 19 constituting the filter region. In this second embodiment of FIGS. 6A and 6B, the upper optical waveguide 4a is in a ridge structure while the lower optical waveguide 2 is in a buried structure using the semi-insulating layer 7 in order to pinch the currents injected from the electrodes into the optical waveguides efficiently.

In the optical ADM device in such a configuration, while in a state of not carrying out the current injection or the electric field application by the p-side electrode 8 and the n-side electrode 9, the light signals of the wavelength λ determined by the period Λ of the diffraction grating 10 and the effective refractive index of the filter region are reflected by the diffraction grating 10 similarly as in the optical ADM device of FIGS. 5A and 5B, but when the currents are injected by the p-side electrode 8 and the n-side electrode 9 or the electric field is applied between the p-side electrode 8 and the n-side electrode 9, the effective refractive index n of the filter region can be changed, so that the wavelength λ of the light signals to be reflected by the diffraction grating 10 can be made variable. In other words, the channel to be selected by the diffraction grating 10 can be changed easily.

Note that the first and second embodiments described above use the ridge structure in which the cladding layer 5 is formed as a ridge on the upper optical waveguide layer 4, and the upper optical waveguide 4a is formed inside the upper optical waveguide layer 4 at a portion located directly below the cladding layer 5, but instead of forming the upper optical waveguide 4a by providing the ridge shaped cladding layer, it is also possible to form the upper optical waveguide in a buried structure inside the upper optical waveguide layer 4 similarly as the lower optical waveguide 2.

Also, in the first and second embodiments described above, only two optical waveguides 2 and 4a are formed along a direction perpendicular to a plane of the semiconductor substrate 1 (which will be referred hereafter as a vertical direction) and these two optical waveguides 2 and 4a are provide in parallel and in proximity to each other along the vertical direction at the coupling section 19, but a number of optical waveguides is not necessarily limited to just two, and three or more optical waveguides may be provided.

For example, three optical waveguides can be provided along the vertical direction in such a manner that, at the coupling section of the three, the second optical waveguide is provided over the first optical waveguide in parallel and in proximity to each other while the third optical waveguide is provided over the second optical waveguide in parallel and in proximity to each other, and the first diffraction grating is provided between the first and second optical waveguides while the second diffraction grating is provided between the second and third optical waveguides. In such a configuration, it is possible to drop/add the light signals as the first and second diffraction gratings respectively reflect the light signals of the wavelengths $\lambda_1$ and $\lambda_2$ determined by the periods $\Lambda_1$ and $\Lambda_2$ of the first and second diffraction gratings and the effective refractive index of the filter region.

In addition, in such a case, it is also possible to form the p-side electrode and the n-side electrode outside the first, second and third optical waveguides similarly as in a case of FIGS. 6A and 6B, so as to make the wavelengths of the light signals to be selected by the first and second diffraction gratings variable by carrying out the current injection or the electric field application by the electrodes.

Next, with references to FIGS. 7A and 7B, one concrete example of the optical ADM device as shown in FIGS. 6A and 6B will be described.

Figure 7B:
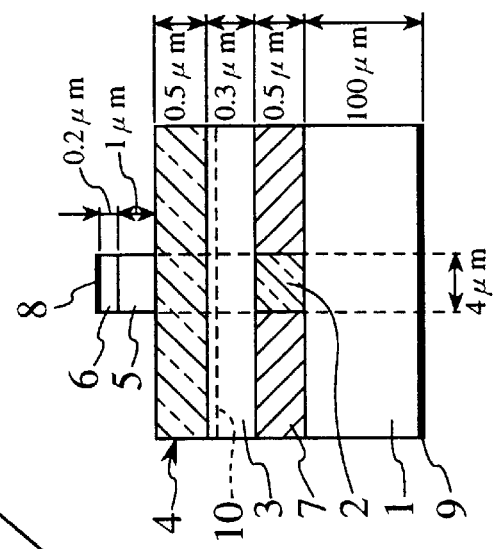
FIG. 7B is a cross sectional view of the optical add/drop multiplexer device of FIG. 7A along VIIB—VIIB line indicated in FIG. 7A.
Figure 7A:
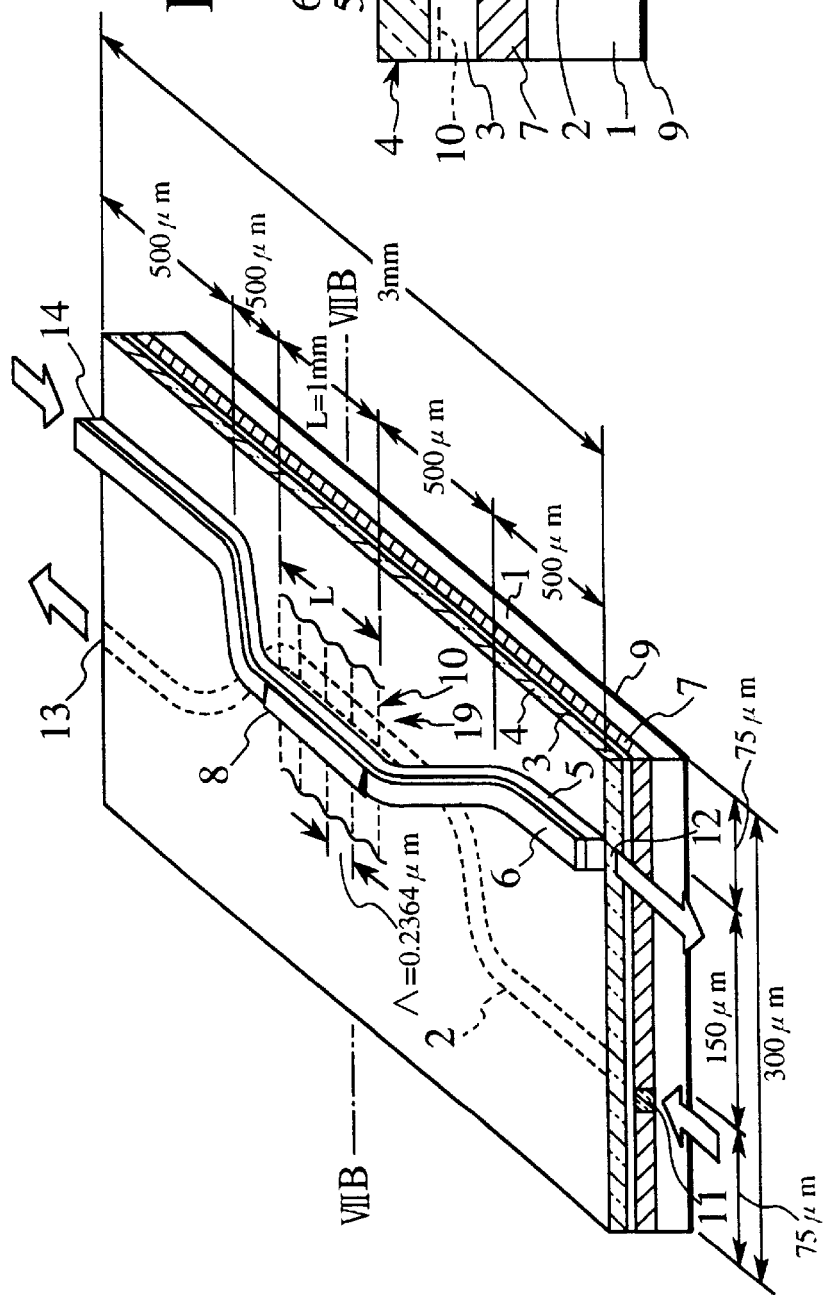
FIG. 7A is a perspective view of one concrete example of the optical add/drop multiplexer device according to the second embodiment of the present invention.

In this concrete example, as shown in FIG. 7A, an entire optical ADM device chip has a size of 3 mm length in a longitudinal direction which is a light propagation direction and 300 $\mu$m length in a transverse direction. Within 3 mm length in the longitudinal direction of this optical ADM device, the coupling section 19 constituting the filter region occupies 1 mm length, the curved waveguide portions of the optical waveguides 2 and 4a occupy 500 $\mu$m length on both sides of the coupling section 19, and each of the other straight waveguide portions occupies 500 $\mu$m length. Also, within 300 $\mu$m length in the transverse direction of this optical ADM device, a length between the input port 11 and the drop port 12 is 150 $\mu$m, and a length of each side edge portion is 75 $\mu$m.

On the other hand, as shown in FIG. 7B, sizes in a cross section of this optical ADM device are as follows. A thickness of the semiconductor substrate 1 is 00 $\mu$m, a thickness of the semi-insulating layer 7 which contains the lower optical waveguide 2 is 0.5 $\mu$m, and a thickness of the waveguide separation layer 3 is 0.3 $\mu$m. Also, a thickness of the upper optical waveguide layer 4 is 0.5 $\mu$m, a thickness of the cladding layer 5 is 1 $\mu$m, and a thickness of the capping layer is 0.2 $\mu$m. Also, a width of the cladding layer 5 is 4 $\mu$m.

In a case where the diffraction grating 10 has a period $\Lambda$ equal to 0.2364 $\mu$m and a depth equal to 0.03 $\mu$m, each portion of this optical ADM device is formed by the material as described above in sizes as described above, and the current injection by the electrodes is not carried out, it is possible to reflect the wavelength of 1.55 $\mu$m. According to the numerical calculation, this structure can be expected to realize the narrow bandwidth filter characteristic in which the 3 dB bandwidth for the reflected spectrum is 0.7 nm in the device with the coupling length equal to 1 mm. Moreover, by injecting the current of 300 mA at the electrodes 8 and 9, it is possible to change the wavelength by approximately 7 nm.

Figure 8A:
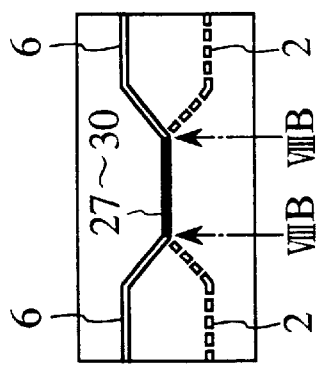
FIG. 8A is a top plan view of an optical add/drop multiplexer device according to the third embodiment of the present invention.
Figure 8B:
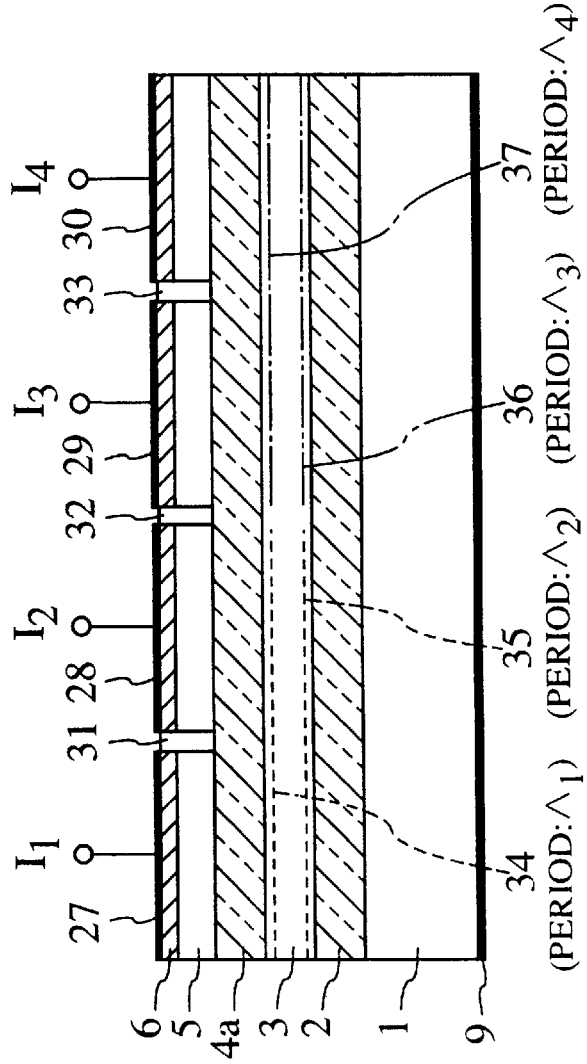
FIG. 8B is a cross sectional view of the optical add/drop multiplexer device of FIG. 8A along VIIIB—VIIIB line indicated in FIG. 8A.

Next, FIGS. 8A and 8B show a configuration of the optical ADM device according to the third embodiment of the present invention. This optical ADM device of FIGS. 8A and 8B differs from that of FIGS. 6A and 6B in that a plurality of diffraction gratings are provided in the vertical direction and in the light propagation direction, while a plurality of p-side electrodes are provided in such a manner that the current injection or the electric field application to each of these p-side electrodes can be carried out independently. The rest of the configuration, the materials and the operation of this optical ADM device of FIGS. 8A and 8B are identical to those of FIGS. 6A and 6B so that the corresponding structural elements are given the same reference numerals in the figures and their description will be omitted.

In the optical ADM device of FIGS. 8A and 8B, the p-side electrode formed on the capping layer 6 is divided into a plurality of p-side electrodes 27, 28, 29 and 30 along the light propagation direction, while the capping layer 6 and the cladding layer 5 are also similarly divided in correspondence to these p-side electrodes, and high resistance regions 31, 32 and 33 are formed at gaps between the divided portions in order to separate the divided portions electrically.

Also, a first diffraction grating 34 and a second diffraction grating 35 are formed as layers along the vertical direction within a part of the waveguide separation layer 3 located directly below the first p-side electrode 27 and the second p-side electrode 28, while a third diffraction grating 36 and a fourth diffraction grating 37 are formed as layers along the vertical direction within a part of the waveguide separation layer 3 located directly below the third p-side electrode 29 and the fourth p-side electrode 30. Here, the first diffraction grating 34 and the fourth diffraction grating 37 are provided adjacent to each other at an upper side within the waveguide separation layer 3 along the light propagation direction, while the second diffraction grating 35 and the third diffraction grating 36 are provided adjacent to each other at a lower side within the waveguide separation layer 3 along the light propagation direction.

Note that the first, second third and fourth diffraction gratings 34, 35, 36 and 37 are formed to have mutually different periods $\Lambda_1, \Lambda_2, \Lambda_3$ and $\Lambda_4$, respectively. In addition, the injection currents $I_1$ to $I_4$ to be injected into the first to fourth p-side electrodes 27 to 30, respectively, can be controlled independently in this configuration. The injection current $I_1$ is injected into the first p-side electrode 27 to change the effective refraction index of the optical waveguides 2 and 4a located directly below the first p-side electrode 27 so as to change the reflection characteristic of the first diffraction grating 34 and the second diffraction grating 35. Similarly, the injection current $I_2$ is injected into the second p-side electrode 28 to change the reflection characteristic of the first diffraction grating 34 and the second diffraction grating 35, the injection current $I_3$ is injected into the third p-side electrode 29 to change the reflection characteristic of the third diffraction grating 36 and the fourth diffraction grating 37, and the injection current $I_4$ is injected into the fourth p-side electrode 30 to change the reflection characteristic of the third diffraction grating 36 and the fourth diffraction grating 37. In this manner, by using respectively different injection currents $I_1$ to $I_4$ and respectively different periods $\Lambda_1$ to $\Lambda_4$ for the first to fourth diffraction gratings 34 to 37, it is possible make these diffraction gratings 34 to 37 to reflect the light signals of respectively different wavelengths.

Next, with reference to FIG. 9, the operation of the optical ADM device according to this third embodiment will be described.

As shown in a part (a) of FIG. 9, in a case of using eight channels (ch. 1) to (ch. 8) in WDM, it is possible to set up the channel interval periods $\Lambda_1$ to $\Lambda_4$ and the injection currents $I_1$ to $I_4$ such that the first to fourth diffraction gratings 34 to 37 are allocated to the channels (ch. 1) to (ch. 8). For example, it is possible to allocate the first diffraction grating 34 to the first channel (ch. 1), the second diffraction grating 35 to the second channel (ch. 2), the first diffraction grating 34 to the third channel (ch. 3), the second diffraction grating 35 to the fourth channel (ch. 4), the third diffraction grating 36 to the fifth channel (ch. 5), the fourth diffraction grating 37 to the sixth channel (ch. 6), the third diffraction grating 36 to the seventh channel (ch. 7), and the fourth diffraction grating 37 to the eighth channel (ch. 8).

More specifically, when an appropriate amount of the first injection current $I_1$ is supplied from the first p-side electrode 27, the effective refractive index n of the filter region directly below the first p-side electrode 27 will be changed, and the wavelengths $\lambda_1$ and $\lambda_2$ of the first and second channels (ch. 1) and (ch. 2) can be set equal to two wavelengths of the light signals to be reflected respectively by the first and second diffraction gratings 34 and 35, which are determined according to the changed effective refractive index n and the periods $\Lambda_1$ and $\Lambda_2$ of the first and second diffraction gratings 34 and 35. In this manner, the first and second diffraction gratings 34 and 35 can respectively reflect the first and second channels (ch. 1) and (ch. 2) and drop them from the drop port.

Similarly, when the second injection current $I_2$ which is different from the first injection current $I_1$ is supplied from the second p-side electrode 28, the first and second diffraction gratings 34 and 35 can respectively reflect the third and fourth channels (ch. 3) and (ch. 4) of different wavelengths $\lambda_3$ and $\lambda_4$ and drop them from the drop port.

Similarly, when the third injection current $I_3$ is supplied from the third p-side electrode 29, the third and fourth diffraction gratings 36 and 37 can respectively reflect the fifth and sixth channels (ch. 5) and (ch. 6) of different wavelengths $\lambda_5$ and $\lambda_6$ and drop them from the drop port.

Similarly, when the fourth injection current $I_4$ which is different from the third injection current $I_3$ is supplied from the fourth p-side electrode 30, the third and fourth diffraction gratings 36 and 37 can respectively reflect the seventh and eighth channels (ch. 7) and (ch. 8) of different wavelengths $\lambda_7$ and $\lambda_8$ and drop them from the drop port.

Note that, in the third embodiment described above, the periods $\Lambda_3$ and $\Lambda_4$ of the third and fourth diffraction gratings 36 and 37 are set to be different from the periods $\Lambda_1$ and $\Lambda_2$ of the first and second diffraction gratings 34 and 35, but it is also possible to set the periods $\Lambda_3$ and $\Lambda_4$ of the third and fourth diffraction gratings 36 and 37 to be equal to the periods $\Lambda_1$ and $\Lambda_2$ of the first and second diffraction gratings 34 and 35, respectively. Even in such a case, by appropriately setting the third and fourth injection currents $I_3$ and $I_4$, it is still possible to add/drop the light signals of eight channels similarly as in a case described with reference to a part (a) of FIG. 9.

Also, the above description based on a part (a) of FIG. 9 is directed to a state in which all of the eight channels are reflected and dropped simultaneously by the respective diffraction gratings, as each p-side electrode controls the corresponding two diffraction gratings into the drop state simultaneously. However, it is also possible for each p-side electrode to control one corresponding diffraction grating into the drop state while controlling the other corresponding diffraction grating into the through state.

More specifically, in a state described with reference to a part (a) of FIG. 9, when the injection current $I_1$ supplied to the first p-side electrode 27 is increased as indicated in an upper half of a part (b) of FIG. 9, the effective refractive index n of the optical waveguide related to the first p-side electrode 27 is changed in accordance with the injection current increase, and thereby the wavelength of the light signals reflected by the first and second diffraction gratings 34 and 35 are also changed. Consequently, when this injection current $I_1$ is increased until the central wavelength of the reflection characteristic of the second diffraction grating 35 drops the first channel (ch. 1), the second channel (ch. 2) can be set in the through state so that only the first channel (ch. 1) will be dropped.

On the other hand, when this injection current $I_1$ is decreased until the central wavelength of the reflection characteristic of the second diffraction grating 35 drops the second channel (ch. 2), the first channel (ch. 1) can be set in the through state so that only the second channel (ch. 2) will be dropped. Similarly, it is also possible to set both of the first and second channels (ch. 1) and (ch. 2) in the through state. The same also applies to the other channels.

According to the above description, the optical ADM device of the third embodiment can add/drop the light signals of arbitrary eight channels out of N channels, where N is an integer greater than eight. In addition, the add/drop for even greater number of channels can also be realized in the similar manner.

Note that the third embodiment of FIGS. 8A and 8B is directed to a case in which two diffraction gratings are provided in the vertical direction and two diffraction gratings are provided in the light propagation direction, but a number of diffraction gratings to be used is not necessarily limited to just two, and any desired number of diffraction gratings may be used.

Also, the third embodiment of FIGS. 8A and 8B is directed to a case in which a plurality of diffraction gratings are provided along both the vertical direction and the light propagation direction, but it is also possible to achieve the similar effects by providing a plurality of diffraction gratings only along the vertical direction or the light propagation direction and providing a plurality of electrodes with respect to each diffraction grating.

Figure 10A:
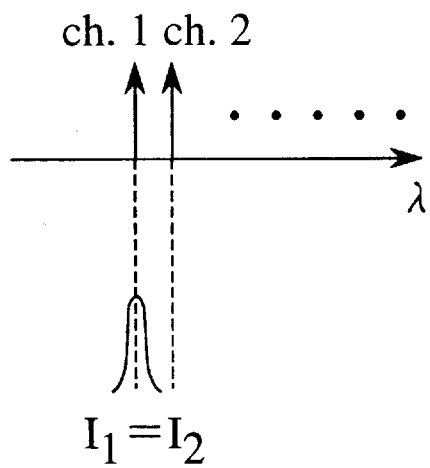
FIGS. 10A and 10B are diagrams for explaining another exemplary operation of the optical add/drop multiplexer device of FIGS. 8A and 8B.
Figure 10B:
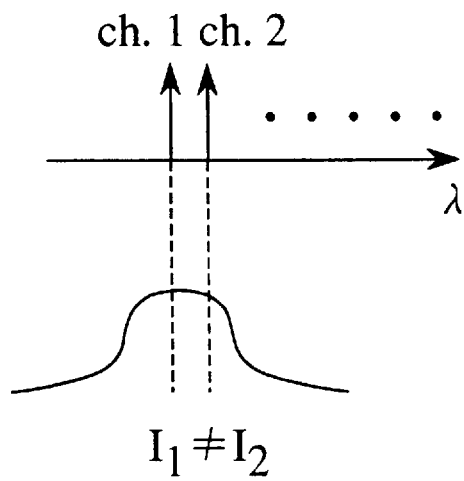

Moreover, as shown in FIG. 10A, it is also possible to set the injection currents $I_1$ and $I_2$ to be supplied to the first and second p-side electrodes 27 and 28 equal to each other ($I_1=I_2$), while setting a state for dropping only the first channel (ch. 1) by the reflections at two filter regions corresponding to these two p-side electrodes 27 and 28 as described above, and then change only the injection current $I_2$ slightly from this state ($I_1 \neq I_2$) so as to displace the central wavelength of the reflection characteristic of the two filter regions corresponding to the two p-side electrodes 27 and 28. In this manner, the coupling length of the filter can be shortened equivalently, so that the half width of the reflection characteristic of the corresponding filter region can be widened as shown in FIG. 10B. By utilizing this effect, it is also possible to realize the switching from a state for dropping only the first channel (ch. 1) to a state for dropping both the first and second channels (ch. 1) and (ch. 2) by means of changing the injection current $I_2$ alone from a value equal to the injection current $I_1$ to a value slightly changed from that of the injection current $I_1$.

Furthermore, in any of the first to third embodiments described above, it is also possible to use the diffraction grating whose coupling strength is varying along the light propagation direction. Here, the varying coupling strength of the diffraction grating can be realized, for example, by varying along the light propagation direction a length of the diffraction grating in a direction perpendicularly intersecting with the optical waveguides at the coupling section formed by adjacent optical waveguides. By means of such a configuration, the characteristic of the filter formed by the coupling section can be sharpened, and the side lobe can be made smaller.

Also, in any of the first to third embodiments described above, the light reflectivity of the diffraction grating is not particularly specified, and it is assumed that the light signals from the input port are 100% reflected to the drop port as an example, but it is also possible to make this reflectivity variable. The change of the reflectivity can be realized, for example, by changing a length of a region in which the diffraction grating is formed along the light propagation direction at the coupling section, a depth of the diffraction grating, a distance between the adjacent optical waveguides, etc. By means of making the reflectivity of the diffraction grating variable in this manner, it becomes possible to utilize only the light signals of a particular wavelength among a plurality of wavelengths, at a plurality of nodes. For instance, the light signals of a particular wavelength can be dropped 30% at the first node, dropped 30% at the second node, and dropped 40% at the third node.

Figure 11:
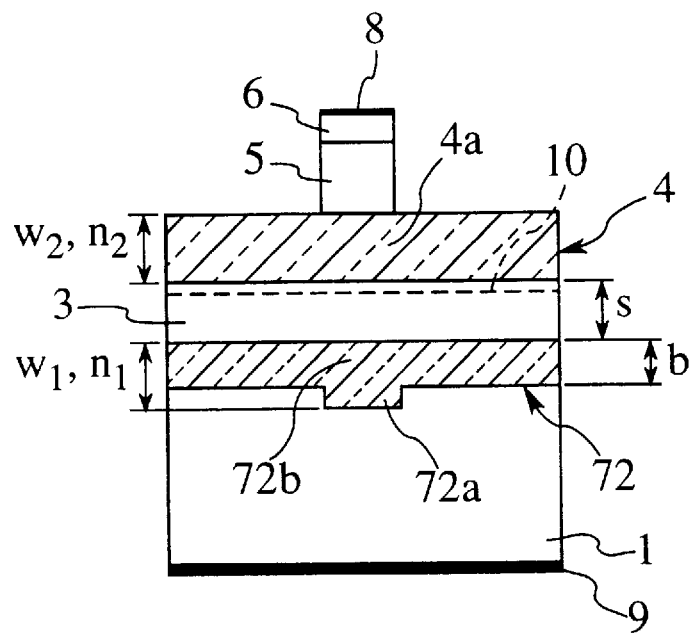
FIG. 11 is a cross sectional view of an optical add/drop multiplexer device according to the fourth embodiment of the present invention.

Next, FIG. 11 shows a configuration of the optical ADM device according to the fourth embodiment of the present invention. This optical ADM device of FIG. 11 differs from that of FIGS. 6A and 6B in that, in contrast to a configuration of FIGS. 6A and 6B in which the lower optical waveguide 2 is formed as a portion sandwiched between two portions of the semi-insulating layer 7, the semi-insulating layer 7 is eliminated and a lower optical waveguide layer 72 made of InGaAsP is formed entirely over the semiconductor substrate 1 in place of the semi-insulating layer 7 and the lower optical waveguide 2 of FIGS. 6A and 6B, where an approximately middle portion of this lower optical waveguide layer 72 is protruded downwards to form a protruded portion 72a such that a lower optical waveguide 72b is formed at a part of the lower optical waveguide layer 72 corresponding to this protruded portion 72a. The rest of the configuration and the operation of this optical ADM device of FIG. 11 are identical to those of FIGS. 6A and 6B so that the corresponding structural elements are given the same reference numerals in the figures and their description will be omitted.

In the embodiments described above, a difference between the propagation constants of the upper optical waveguide 4a and the lower optical waveguide 2 has not been addressed, but when the propagation constants of the optical waveguides are identical, the crosstalk between ports may be caused. For example, In the drop operation shown in FIGS. 5A and 5B where the lights of the Bragg wavelength among the lights entered from the input port 11 are reflected by the diffraction grating 10, if the propagation constants of the optical waveguides are identical, while the lights are lead to the drop port 12 by being coupled to the upper optical waveguide 4a, some of these lights may return to the input port 11. Also, the transmission lights of wavelengths other than the Bragg wavelength are lead to the through port 13, but some of these lights may be lead to the add port 14 at the same time, and these lights can be the crosstalk which gives rise to an adverse effect.

There are cases in which this crosstalk can be reduced by appropriately setting the coupling length and the utilized wavelengths when the propagation constants of the optical waveguides are identical, but this in turn gives rise to restrictions on the coupling length and the wavelengths, and it is difficult to simultaneously reduce the crosstalks for lights of multiple wavelengths.

In view of this fact, the optical ADM device of FIG. 11 sets different propagation constants for the upper optical waveguide 4a and the lower optical waveguide 72b, so as to simultaneously reduce the crosstalks for all the wavelengths and also reduce the dependency of the level of the crosstalk on the coupling length so that the degree of freedom in the device design can be enhanced.

More specifically, as shown in FIG. 11, suppose that the effective refractive index and the propagation constant of the lower optical waveguide 72b having a thickness of $w_1$ and a refractive index of $n_1$ are denoted as $n_{eff1}$ and $\beta_1$, while the effective refractive index and the propagation constant of the upper optical waveguide 4a having a thickness of $w_2$ and a refractive index of $n_2$ are denoted as $n_{eff2}$ and $\beta_2$, and there is a relationship of $n_{eff1} < n_{eff2}$ between the effective refractive indexes of the optical waveguides. Then, there is also a relationship of $\beta_1 < \beta_2$ between the propagation constants of the optical waveguides.

When the wavelength of light is denoted as $\lambda$ and the period of the diffraction grating 10 is denoted as $\Lambda$, the Bragg wavelength for the contra-directional coupling (coupling in opposite directions) between the lower optical waveguide 72b and the upper optical waveguide 4a via the diffraction grating 10 is given as a wavelength $\lambda$ which satisfies the Bragg condition given by the following equation (2).

$$\beta_1+\beta_2=2\pi \cdot n_{eff1}/\lambda+2\pi \cdot n_{eff2}/\lambda=2\pi/\Lambda \qquad (2)$$

Consequently, in the drop operation, the lights of such a wavelength $\lambda$ among the lights entered from the input port 11 will be lead to the drop port 12.

This wavelength $\lambda$ satisfies the Bragg condition for the contra-directional coupling between the lower optical waveguide 72b and the upper optical waveguide 4a, which is largely off the Bragg condition for the contra-directional coupling within the same optical waveguide, so that the contra-directional coupling within the same optical waveguide will hardly be caused. Consequently, there will be hardly any lights of the wavelength $\lambda$ which are entered from the input port 11 and returning to the input port 11. The same also applies to a case of the add operation.

There are also wavelengths $\lambda'$ and $\lambda''$ which are different from the wavelength $\lambda$ and which satisfy the Bragg condition for the contra-directional coupling within the same optical waveguide given by the following equations (3).

$$2\beta_1=2\times 2\pi \cdot n_{eff1}/\lambda'=2\pi/\lambda \qquad (3)$$

$$2\beta_2=2\times 2\pi \cdot n_{eff2}/\lambda''=2\pi/\lambda$$

However, by taking an appropriately large value for a difference between $\beta_1$ and $\beta_2$, it is possible to realize the setting in which these wavelengths $\lambda'$ and $\lambda''$ are put outside the utilized bandwidth.

On the other hand, when two optical waveguides exist in proximity to each other, regardless of existence of the diffraction grating, the co-directional coupling (coupling in the same direction) occurs so that the lights can wander through the optical waveguides as in a case of lights propagating from the lower optical waveguide 72b to the upper optical waveguide 4a and then to the lower optical waveguide 72b again, and so on.

When the input light power is expressed as 1, a rate F of the lights which wander through the optical waveguides can be given by the following equation (4):

$$F=1/\{1+(\Delta/k)^2\} \qquad (4)$$

where a $\Delta=(\beta_1-\beta_2)/2$ indicates a difference between the propagation constants of the two optical waveguides, and k is the coupling coefficient which is mainly determined by the thickness s of the waveguide separation layer 3 for spacing between the two optical waveguides and the field distribution of the propagating lights. Here, when the propagation constants of the two optical waveguides are the same, that is when $\Delta=0$, the rate F is equal to 1 regardless of the size of the coupling coefficient k so that all the transmission lights entered from one optical waveguide can be shifted to the other optical waveguide depending on the coupling length L.

On the other hand, when the difference $\Delta$ between the propagation constants of the two optical waveguides is set large, the rate F of the lights which wander through the two optical waveguides becomes small. In other words, the crosstalk is less for a case of the larger difference between the propagation constants of the two optical waveguides, while the propagation constant of the optical waveguide can be changed by changing a thickness, a composition (a refractive index), or a structure of the optical waveguide.

Consequently, the optical ADM device of FIG. 11 sets different propagation constants for the upper optical waveguide 4a and the lower optical waveguide 72b such that the crosstalks are reduced simultaneously for all the wavelengths and also the dependency of the level of the crosstalk on the coupling length is reduced so that the degree of freedom in the device design can be enhanced.

Now, with reference to FIG. 11, the difference between the propagation constants in this fourth embodiment will be described more specifically. As shown in FIG. 11, denoting a thickness of the waveguide separation layer 3 between the lower optical waveguide 72b and the upper optical waveguide 4a as s, and a thickness of the lower optical waveguide layer 72 as b, the following setting of the parameters is used: $w_1$=0.8 μm, $n_1$=3.385, $w_2$=0.5 μm, $n_2$=3.310, s = 0.8 μm, b =0.35 μm, the coupling length L=3.0 mm, and the depth of the diffraction grating 10 d =0.05 μm. Then, for the lights in the TEO mode with the wavelength 1.55 μm, the rate F of the lights which wander through the two optical waveguides is 0.0033, the reflectivity is 1, and the full width at half maximum is 3 Å. Also, there are hardly any lights among the lights of 1.55 μm wavelength which are entered from the input port 11 and returning to the input port 11. In this case, the difference between the propagation constants of the two optical waveguides is approximately 3%.

An exact value of the difference between the propagation constants of the two optical waveguides should be determined in view of the factors such as a wavelength range and a number of wavelengths to be used, a limitation on a size of the device, etc., but a value in a range of about 0.5% to 10% is expected to be appropriate for most cases.

Note that the fourth embodiment is described above for a case of using different structures for the lower optical waveguide 72b and the upper optical waveguide 4a, but the same structure may be used for the two optical waveguides, and this fourth embodiment can be realized for any combination of various structures available for the optical waveguides.

As described, according to the present invention, a plurality of optical waveguides are formed in layers with a prescribed interval in the vertical direction of the semiconductor substrate, while the diffraction grating is formed at the coupling section at which the optical waveguides are in parallel and in proximity to each other, and the light signals of a specific wavelength among the light signals entered into one of the adjacent optical waveguides forming the coupling section are reflected to the other one of the adjacent optical waveguides by the diffraction grating, so that it is possible to add/drop the light signals of arbitrary wavelength accurately at a high reliability by a simple and compact structure.

Also, according to the present invention, when the light signals of a specific wavelength among the light signals, which are entered into one of the adjacent optical waveguides among a plurality of optical waveguides formed in layers with a prescribed interval in the vertical direction of the semiconductor substrate, are reflected to the other one of the adjacent optical waveguides by the diffraction grating, the wavelength of the light signals to be reflected by the diffraction grating can be made variable by carrying out the current injection or the electric field application from the electrode structure, so that it is possible to provide the optical ADM device which is capable of arbitrarily changing the wavelength of the light signals that can be subjected to the add/drop operation by means of the current injection or the electric field application, at a high reliability in a simple and compact structure. Consequently, it becomes easier to construct the dynamic WDM network which can flexibly deal with the change of the channel demand and which is also useful for the restoration at a time of emergency. In addition, it is also possible to drastically improve the flexibility of the WDM network.

Moreover, according to the present invention, a plurality of diffraction gratings with respectively different periods can be formed along either one or both of the vertical direction of the semiconductor substrate and the light propagation direction, and the current injection or the electric field application from the electrode structure can be carried out independently for each diffraction grating or simultaneously for all the diffraction gratings, so that it is possible to reflect or pass the light signals of different wavelengths by the respective diffraction gratings.

Furthermore, according to the present invention, at least one of the optical waveguides connected to the coupling section can be formed by a curved waveguide, so that the coupling with the external fiber, etc., can be made easier.

Moreover, according to the present invention he coupling strength of the diffraction grating can be changed along the light propagation direction, so that the characteristic of the filter formed by the coupling section can be sharpened, and the side lobe can be made small.

Furthermore, according to the present invention, the propagation constant of at least one optical waveguide among a plurality of optical waveguides can be set different from those of the other optical waveguides, or the propagation constants of a plurality of optical waveguides can be set different from each other, so that the crosstalk among the optical waveguides can be reduced, and it is possible to realize the optical ADM device with the very narrow bandwidth filter characteristic.

It is to be noted that, in each embodiment described above, it is possible to use any desired waveguide structure including the buried structure using Fe—InP, the buried structure using p-n reverse junction, the ridge structure, etc., for the light waveguiding and current pinching structure. It is also possible to use a superlattice waveguide for the optical waveguide. As for the semiconductor material, apart from InGaAsP/InP type described above, it is also possible to use the other types of semiconductor material such as AlGaInAs/InP type, AlGaAs/GaAs type, etc.

In addition, it is also possible to realize the optical ADM device of the present invention by using the waveguide structure other than the semiconductor based one, such as those using $SiO_2$/Si, $SiO_2$—$GeO_2$/Si, etc., and the tuning function can be realized by using the refractive index changing mechanism suitable for the utilized waveguide structure such as that based on the thermo-optic effect.

Figure 12:
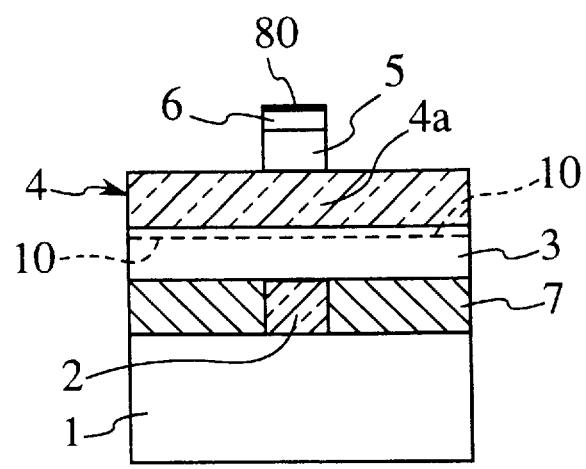
FIG. 12 is a cross sectional view of an optical add/drop multiplexer device according to one modification of the second embodiment of the present invention.

Moreover, the electrode structure formed by two electrodes provided on top and bottom sides of the optical ADM device used in the second to fourth embodiments for the purpose of changing the effective refractive index of the filter region can be replaced by a single heater electrode provided on one side of the optical ADM device so that the effective refractive index of the filter region can be changed due to the heat applied by this heater electrode. For example, a configuration of the second embodiment shown in FIG. 6B can be modified into a configuration as shown in FIG. 12, where a heater electrode 80 is provided on top of the capping layer 6 instead of the electrodes 8 and 9 of FIG. 6B. The heater electrode 80 may be provided below the semiconductor substrate 1 instead, if desired.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical add/drop multiplexer device, comprising:
   a substrate member;
   a plurality of optical waveguides, formed over the substrate member in layers with a prescribed interval along a direction perpendicular to a plane of the substrate member, each optical waveguide having a portion arranged in parallel and in proximity to an adjacent optical waveguide to form a coupling section; and
   a diffraction grating member, provided at the coupling section and having a prescribed period along a light propagation direction, for reflecting light signals with a specific wavelength among light signals entered from one of adjacent optical waveguides to another one of the adjacent optical waveguides, the diffraction grating member having a reflectivity which is variable according to at least one of parameters including a length of a region in the light propagation direction for which the diffraction grating member is provided at the coupling section, a depth of the diffraction grating member with respect to the adjacent optical waveguides at the coupling section, and a distance between the adjacent optical waveguides at the coupling section.

2. The device of claim 1, wherein an outermost optical waveguide is formed by an optical waveguide layer made of a material for the outermost optical waveguide and arranged to cover one side of the device entirely at a layer position of the outermost optical waveguide, and a cladding layer provided in a form of protrusion on the optical waveguide layer over a position of the outermost optical waveguide within the optical waveguide layer.

3. The device of claim 1, further comprising:
   a heater electrode, provided on one side of said plurality of optical waveguides along said direction perpendicular to the plane of the substrate member, for carrying out a heat application with respect to the coupling section in order to change the specific wavelength of light signals to be reflected by the diffraction grating member.

4. The device of claim 1, further comprising:
   a waveguide separation layer formed between each adjacent optical waveguides, wherein the diffraction grating member is formed by shaping a contacting surface between the waveguide separation layer and one optical waveguide into a corrugated shape or a rugged shape with the prescribed period along the light propagation direction.

5. The device of claim 1, further comprising:
   at least one additional diffraction grating member, provided at the coupling section and having another prescribed period along the light propagation direction, for reflecting light signals with another specific wavelength among light signals entered from one of the adjacent optical waveguides to another one of the adjacent optical waveguides.

6. The device of claim 5, wherein the diffraction grating member and the additional diffraction grating member are arranged in parallel to each other along the light propagation direction.

7. The device of claim 5, wherein the diffraction grating member and the additional diffraction grating member are arranged in parallel to each other along said direction perpendicular to the plane of the substrate member.

8. The device of claim 5, wherein the diffraction grating member and the additional diffraction grating member are arranged in parallel to each other along the light propagation direction and said direction perpendicular to the plane of the substrate member.

9. The device of claim 5, wherein the diffraction grating member and the additional diffraction grating member have different periods along the light propagation direction.

10. The device of claim 5, further comprising:
    a waveguide separation layer formed between each adjacent optical waveguides, wherein the diffraction grating member and the additional diffraction grating member are provided within the waveguide separation layer and made of a material for the optical waveguides.

11. The device of claim 1, wherein at least one of each adjacent optical waveguides has curved portions connected with a portion forming the coupling section.

12. The device of claim 1, wherein the diffraction grating member has a strength of coupling with respect to the optical waveguides at the coupling section which is varying along the light propagation direction.

13. The device of claim 1, wherein said plurality of optical waveguides include one optical waveguide which has a propagation constant different from that of another optical waveguide among said plurality of optical waveguides.

14. The device of claim 13, wherein said one optical waveguide has one of a thickness, a refractive index, and a structure different from said another optical waveguide so as to make the propagation constant different from said another optical waveguide.

15. The device of claim 13, wherein a difference between propagation constants of said one optical waveguide and said another optical waveguide is in a range of 0.5% to 10 %.

16. The device of claim 1, wherein said plurality of optical waveguides have mutually different propagation constants.

17. The device of claim 16, wherein each optical waveguide has one of a thickness, a refractive index, and a structure different from other optical waveguides among said plurality of optical waveguides so as to make the propagation constant different from the other optical waveguides.

18. The device of claim 16, wherein a difference between propagation constants of each two optical waveguides is in a range of 0.5% to 10%.

19. The device of claim 1, further comprising:
    an electrode structure, provided on both sides of said plurality of optical waveguides along said direction perpendicular to the plane of the substrate member, for carrying out a current injection or an electric field application with respect to the coupling section in order to change the specific wavelength of light signals to be reflected by the diffraction grating member.

20. The device of claim 19, wherein the electrode structure includes a first electrode member formed over one side of the substrate member opposite to another side on which said plurality of optical waveguides are arranged, and a second electrode member formed over an outermost optical waveguide on said another side of the substrate member.

21. The device of claim 19, wherein an outermost optical waveguide is formed by an optical waveguide layer made of a material for the outermost optical waveguide and arranged to cover one side of the device entirely at a layer position of the outermost optical waveguide, and a cladding layer provided in a form of protrusion on the optical waveguide layer over a position of the outermost optical waveguide within the optical waveguide layer; and the electrode structure includes a first electrode member formed over one side of the substrate member opposite to another side on which said plurality of optical waveguides are arranged, a capping layer formed over the cladding layer, and a second electrode member formed over the capping layer.

22. The device of claim 19, further comprising:

at least one additional diffraction grating member, provided at the coupling section and having another prescribed period along the light propagation direction, for reflecting light signals with another specific wavelength among light signals entered from one of the adjacent optical waveguides to another one of the adjacent optical waveguides;

wherein the electrode structure carries out the current injection or the electric field application with respect to each diffraction grating member so as to reflect light signals of different wavelengths by the diffraction grating member and the additional diffraction grating member.

23. The device of claim 22, wherein the diffraction grating member and the additional diffraction grating member have different periods and are arranged along said direction perpendicular to the plane of the substrate member.

24. The device of claim 22, wherein the diffraction grating member and the additional diffraction grating member have different periods and are arranged along the light propagation direction.

25. The device of claim 22, wherein the diffraction grating member and the additional diffraction grating member have different periods are and arranged along said direction perpendicular to the plane of the substrate member and the light propagation direction.

26. The device of claim 22, wherein the electrode structure includes a plurality of electrode members which are provided independently along the light propagation direction, so that the current injection or the electric field application can be carried out with respect to the diffraction grating member and the additional diffraction grating member independently or simultaneously.

27. The device of claim 19, wherein the electrode structure includes a plurality of electrode members which are provided independently along the light propagation direction, and which are capable of carrying out the current injection or the electric field application independently or simultaneously.

* * * * *